United States Patent
Saukko et al.

(10) Patent No.: US 10,599,180 B2
(45) Date of Patent: *Mar. 24, 2020

(54) APPARATUS AND ASSOCIATED METHODS

(71) Applicant: NOKIA TECHNOLOGIES OY, Espoo (FI)

(72) Inventors: Jari Saukko, Tampere (FI); Mikko Nurmi, Tampere (FI)

(73) Assignee: Nokia Technologies Oy, Espoo (FI)

(*) Notice: Subject to any disclaimer, the term of this patent is extended or adjusted under 35 U.S.C. 154(b) by 50 days.

This patent is subject to a terminal disclaimer.

(21) Appl. No.: 15/910,123

(22) Filed: Mar. 2, 2018

(65) Prior Publication Data

US 2018/0188776 A1   Jul. 5, 2018

Related U.S. Application Data

(63) Continuation of application No. 13/400,983, filed on Feb. 21, 2012, now Pat. No. 9,964,990.

(51) Int. Cl.
| | |
|---|---|
| *G06F 3/033* | (2013.01) |
| *G06F 1/16* | (2006.01) |
| *H04M 1/725* | (2006.01) |
| *G06F 3/0488* | (2013.01) |
| *G06F 3/0481* | (2013.01) |
| *G06F 3/01* | (2006.01) |
| *G06F 3/0482* | (2013.01) |

(52) U.S. Cl.
CPC .......... *G06F 1/1626* (2013.01); *G06F 1/1694* (2013.01); *H04M 1/72519* (2013.01); *G06F 3/017* (2013.01); *G06F 3/0481* (2013.01); *G06F 3/0482* (2013.01); *G06F 3/04883* (2013.01); *G06F 2200/1614* (2013.01); *H04M 2250/12* (2013.01); *H04M 2250/22* (2013.01)

(58) Field of Classification Search
None
See application file for complete search history.

(56) References Cited

U.S. PATENT DOCUMENTS

| | | |
|---|---|---|
| 5,910,882 A | 6/1999 | Burrell |
| 7,978,176 B2 | 7/2011 | Forstall et al. |

(Continued)

FOREIGN PATENT DOCUMENTS

| | | |
|---|---|---|
| CN | 101291352 A | 10/2008 |
| CN | 102073454 A | 5/2011 |

OTHER PUBLICATIONS

Eric Torunski et al., Gesture Recognition on a Mobile Device for Remote Event Generation, Jul. 1, 2011, IEEE, pp. 1-6 (Year: 2011).*

(Continued)

*Primary Examiner* — Tam T Tran
(74) *Attorney, Agent, or Firm* — Alston & Bird LLP

(57) ABSTRACT

An apparatus including: at least one processor, and at least one memory including computer program code, the at least one memory and the computer program code configured to, with the at least one processor, cause the apparatus to perform at least the following: in response to user input, disassociate the linking of the orientation of content with respect to the orientation of the display of a portable electronic device to retain the particular orientation of the content with respect to the orientation of the display during the user input.

21 Claims, 5 Drawing Sheets

(56) References Cited

U.S. PATENT DOCUMENTS

| | | |
|---|---|---|
| 9,766,788 B2 | 9/2017 | Kerr et al. |
| 2003/0085870 A1 | 5/2003 | Hinckley |
| 2008/0165140 A1* | 7/2008 | Christie .............. G06F 3/04883 345/173 |
| 2008/0259094 A1 | 10/2008 | Kim et al. |
| 2008/0284738 A1 | 11/2008 | Hovden et al. |
| 2009/0209285 A1 | 8/2009 | Mcahan |
| 2010/0188328 A1 | 7/2010 | Dodge et al. |
| 2010/0265185 A1 | 10/2010 | Oksanen |
| 2010/0285844 A1 | 11/2010 | Hosoi et al. |
| 2011/0012926 A1 | 1/2011 | Kerr et al. |
| 2012/0133678 A1* | 5/2012 | Kim ...................... G06F 3/0488 345/649 |
| 2012/0223892 A1 | 9/2012 | Matsubara et al. |
| 2012/0254808 A1 | 10/2012 | Gildfind |
| 2013/0050131 A1* | 2/2013 | Lee .................... G08G 1/09626 345/174 |

OTHER PUBLICATIONS

Yang Li, Gesture Search: Random Access to Smartphone Content, Jan. 1, 2012, IEEE, pp. 10-13 (Year: 2012).*

Abby A. Goodrum, Multidimensional Scaling of Video Surrogates, Jan. 15, 2001, Journal of the American Society for Information Science and Technology, 52(2): 174-182 (Year: 2001).

Advisory Action for U.S. Appl. No. 13/400,983 dated Mar. 7, 2014.

European Search Report for Application No. EP 13 75 1997 dated Nov. 6, 2015.

International Search Report and Written Opinion for Application No. PCT/IB2013/051386 dated Dec. 9, 2013.

Lyn Bartram, Filtering and brushing with motion, 2002 Information Visualization, 66-79 (Year: 2002).

Notice of Allowance for U.S. Appl. No. 13/400,983 dated Nov. 30, 2017.

Office Action for U.S. Appl. No. 13/400,983 dated Aug. 2, 2013.

Office Action for U.S. Appl. No. 13/400,983 dated Jul. 18, 2014.

Office Action for U.S. Appl. No. 13/400,983 dated Mar. 9, 2016.

Office Action for U.S. Appl. No. 13/400,983 dated Nov. 25, 2014.

Office Action for U.S. Appl. No. 13/400,983 dated Nov. 29, 2013.

Office Action for U.S. Appl. No. 13/400,983 dated Sep. 22, 2016.

Office Action from corresponding Chinese Patent Application No. 201380020608.4 dated Mar. 27, 2017.

Office Action from corresponding Chinese Patent Application No. 201380020608.4 dated Oct. 23, 2017, with brief English summary, 4 pages.

Office Action from U.S. Appl. No. 13/400,983 dated Jun. 14, 2017, 20 pages.

Office Action for European Application No. 13 751 997.1 dated Aug. 15, 2018, 5 pages.

Office Action for European Application No. 13 751 997.1 dated Jan. 3, 2019.

Office Action for Indian Application No. 7163/DELNP/2014 dated Jul. 10, 2019.

* cited by examiner

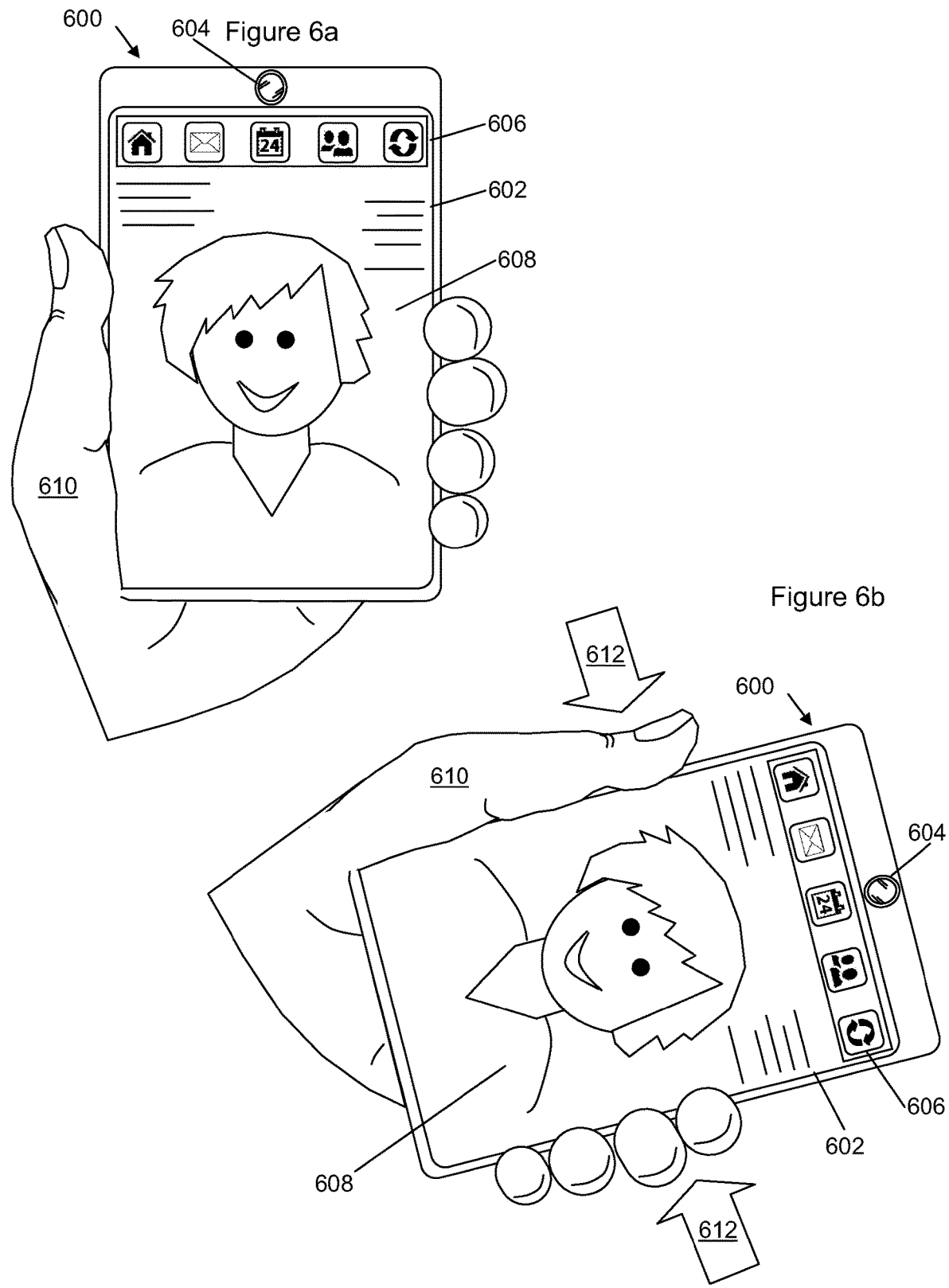

APPARATUS AND ASSOCIATED METHODS

CROSS REFERENCE TO RELATED APPLICATION

This application is a continuation of and claims priority to U.S. application Ser. No. 13/400,983, filed Feb. 21, 2012, the entire contents of which are hereby incorporated by reference.

TECHNICAL FIELD

The present disclosure relates to the field of user interfaces, associated methods, computer programs and apparatus. Certain disclosed aspects/embodiments relate to portable electronic devices, in particular, so-called hand-portable electronic devices which may be handheld in use (although they may be placed in a cradle in use). Such hand-portable electronic devices include so-called Personal Digital Assistants (PDAs), mobile telephones, smartphones and other smart devices, and tablet PCs.

The portable electronic devices/apparatus according to one or more disclosed aspects/embodiments may provide one or more audio/text/video communication functions (e.g., tele-communication, video-communication, and/or text transmission (Short Message Service (SMS)/Multimedia Message Service (MMS)/emailing) functions), interactive/non-interactive viewing functions (e.g., web-browsing, navigation, TV/program viewing functions), music recording/playing functions (e.g., MP3 or other format and/or (FM/AM) radio broadcast recording/playing), downloading/sending of data functions, image capture function (e.g., using a (e.g., in-built) digital camera), and gaming functions.

BACKGROUND

Portable electronic devices often have at least one display for displaying content. A portable electronic device may also be able to determine its orientation. For example, a portable electronic device may be oriented so that the display of the device is in a landscape orientation, and the portable electronic device may comprise an element such as a gyroscope, for example, so that the portable electronic device can determine that its display is in a landscape orientation. Portable electronic devices may use determined orientation information to show content on a display in a particular way.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first aspect there is provided an apparatus comprising at least one processor; and at least one memory including computer program code, the at least one memory and the computer program code configured to, with the at least one processor, cause the apparatus to perform at least the following:

in response to user input, disassociate the linking of the orientation of content with respect to the orientation of a display of a portable electronic device to retain the particular orientation of the content with respect to the orientation of the display during the user input.

Therefore, a portable electronic device may, in the absence of user input, and if the display of the apparatus is rotated, also rotate the orientation of the displayed content so that, for example, the orientation of the display and of the content match. For example, an apparatus/device may be able to display text. If the display of the apparatus/device is in a portrait configuration, then the text may also be displayed in a portrait configuration. If the display of the apparatus/device is rotated from a portrait to a landscape configuration, then the displayed text may also change orientation so as to be displayed in a landscape configuration.

However, in response to a user input and during the user input, upon the display of the apparatus/device being rotated from a portrait to a landscape orientation, the displayed text may not also rotate from a portrait to a landscape orientation. The text may remain displayed in a portrait configuration even though the display has rotated away from a portrait orientation.

Upon termination of the user input, the orientation of content on the display of the portable electronic device may be re-associated with the orientation of the display. That is, in response to user input, the apparatus may disassociate the linking of the orientation of content with respect to the orientation of a display of a portable electronic device to retain the particular orientation of the content with respect to the orientation of the display during the user input. Upon termination of the user input, for example, a user moving his thumb away from a position proximal the surface of a proximity-sensitive display, then the apparatus may again associate the orientation of content on a display of the portable electronic device with the orientation of the display.

The apparatus may be configured to detect the user input during use of one or more of a particular supplementary application of the portable electronic device and a home screen of the portable electronic device. For example, the user input may be detected while an apparatus/device is running a particular supplementary application, or while a home screen of the apparatus/device is being displayed. A particular supplementary application may be a calling/telephone application, text message application, e-mail application, video application, audio application, word processing or other productivity application, game, social media application, internet browser, contact list application, calendar application, photo application or calculator application, for example. The user input need not necessarily be made while displaying a menu system of the apparatus.

The user input may be a hover gesture. The hover gesture may be made by a user hovering a thumb, finger, or palm, for example, over a proximity-sensitive region of the portable electronic device such as a proximity-sensitive display. Thus the apparatus may be configured to detect a hover gesture user input proximal to a proximity-sensitive display of the portable electronic device as the user input.

The apparatus may be configured to detect a hover gesture user input only overlying one or more user interface elements displayed on a proximity-sensitive display of the portable electronic device as the user input. That is, one or more user interface elements may be displayed and a hover gesture user input may be detected proximal to these user interface elements as the user input. The one or more user interface elements may comprise one or more of a button, an icon, a form, a widget, a hyperlink, a slider, a scroll bar, or a virtual control element. A user interface element may be considered to be a displayed element with which a user may interact, for example by selecting it (via a user input such as a touch, tap, click, or other user input.)

The apparatus may be configured to respond to the user input from one or more of a proximity-sensitive display and a touch-sensitive display of the portable electronic device. Such a display may allow user inputs to be made by a user touching, or moving a finger or other object in proximity to, the display. A display with both touch-sensitive and proximity-sensitive properties may be able to detect a proximal input as a different type of input to a touch input.

The apparatus may be configured to detect a hover gesture user input only proximal to a region not overlying one or more user interface elements displayed on a proximity-sensitive display of the portable electronic device. That is, the detected user input may be a hover gesture over a region of a proximity-sensitive display which does not display any user interface elements such as buttons or icons. Thus the user may perform a hover gesture user input over a "background" region of displayed content which does not display any user interface elements to disassociate the linking of the orientation of content with respect to the orientation of the display of the portable electronic device. The one or more user interface elements may comprise one or more of a button, an icon, a form, a widget, a hyperlink, a slider, a scroll bar, or a virtual control element. A user interface element may be considered to be a displayed element with which a user may interact, for example by selecting it (via a user input such as a touch, tap, click, or other user input.)

The apparatus may be configured to detect a hover input as the user input for response and a touch input to select a function associated with the touched region. For example, a portable electronic device may be displaying a screen with an "answer" button as an incoming telephone call is being indicated to the user. The user may be able to hover a finger or thumb, for example, over the "answer" button to disassociate the linking of the orientation of content with respect to the orientation of a display of a portable electronic device, and thereby retain the particular orientation of the content with respect to the orientation of the display during the user input. The user may then rotate the orientation of the portable electronic device and the user's finger or thumb will still be hovering over the location corresponding to the "answer" button as the displayed content will not re-orient according to the detected orientation of the display during the user input. The user may then provide a touch input to the "answer" button (with the same finger or thumb used to hover, for example) in order to select a function associated with the touched region i.e., to answer the incoming call. The one or more user interface elements may comprise one or more of a button, an icon, a form, a widget, a hyperlink, a slider, a scroll bar, or a virtual control element. A user interface element may be considered to be a displayed element with which a user may interact, for example by selecting it (via a user input such as a touch, tap, click, or other user input.)

The apparatus may be configured to detect the user input for response made at one or more particular locations on the portable electronic device, the one or more particular locations being designated to provide for disassociation of the linking of the orientation of content with respect to the orientation of the display. Particular locations on the portable electronic device may be located on a display of the portable electronic device. For example, in the case of a proximity-sensitive display, a user input of a hover close to any region of the proximity-sensitive display may be detected as such a user input. In other examples, the user may be required to hover their finger or other object over one or more particular locations, areas or regions of the proximity-sensitive display. Such particular locations, areas or regions may correspond to the region in which a virtual key or button is displayed, or may correspond to an edge portion, or to the central portion of the proximity-sensitive display, for example.

Particular locations other than those on a display of the device may be, for example, a button, slider or scroll wheel on the edge of the portable electronic device, or may be the back and/or sides of the portable electronic device if the portable electronic device is configured to accept input via those locations. These locations may be designated to provide for disassociation of the linking of the orientation of content with respect to the orientation of the display. For example, the portable electronic device may comprise a touch-sensitive coating or cover located over the back and one or more sides of the portable electronic device which can accept user input, and one or more particular locations on the back and/or sides may be designated to provide for disassociation of the linking of the orientation of content with respect to the orientation of the display.

The user input may comprise one or more of a tap, a swipe, a slide, a press, a hold, a rotate gesture, a static hover gesture proximal to the portable electronic device, a moving hover gesture proximal to the portable electronic device, bending at least part of the portable electronic device, squeezing at least part of the portable electronic device, or a multi-finger gesture.

The particular supplementary application may be one or more of a calling/telephone application, text message application, e-mail application, video application, audio application, word processing or other productivity application, game, social media application, internet browser, contact list application, calendar application, photo application or calculator application. Such an application may be displayed over substantially all of the display, or in other examples, in a region of the display (such as, for example, in a window displayed on a desktop or home screen of the device).

The apparatus may comprise one or more of an accelerometer, a gyroscope and a magnetometer to detect the orientation of the display. Such an element may be configured to allow the apparatus to determine the orientation of a display, for example, by comparison of the detected orientation of the longitudinal axis of the display of the apparatus with a gravity vector. The gravity vector may be defined as being directed towards the centre of the Earth (i.e., towards the ground). The determined orientation of the display of a device may be determined by the apparatus to be at a particular angle with respect to the gravity vector, for example the display orientation as detected by a gyroscope.

The apparatus may be configured to detect the user input for response.

The display may be rectangular, and the orientation of the content on the rectangular display may be a portrait orientation or a landscape orientation. In the example where the apparatus is configured to, in response to user input, disassociate the linking of the orientation of content with respect to the orientation of the rectangular display of the portable electronic device to retain the particular orientation of the content with respect to the orientation of the display during the user input, then upon rotation of the display, the orientation of the displayed content would appear to remain fixed, for example in a portrait orientation or in a landscape orientation with respect to the orientation of the display, and would not appear to rotate or change orientation.

The portable electronic device may be configured to associate the orientation of content on a display of the portable electronic device with the corresponding orientation of the display. That is to say, if the top edge of a display is oriented to be in an uppermost position (for example, a user holding a device upright), then content may also be displayed with the top portion of the content closest to the top edge of the display and the bottom portion of the content closest to the bottom edge of the screen. As another example, if the long left edge of a rectangular display is oriented to be in an uppermost position (for example, a user holding a device in a landscape orientation), then content may also be displayed with the top portion of the content closest to the uppermost long left edge of the display and the bottom portion of the content closest to the lowermost long right edge of the display so that the content is shown in a landscape orientation.

The apparatus may be a portable electronic device, a laptop computer, a mobile phone, a Smartphone, a tablet computer, a personal digital assistant, a digital camera, a watch, a server, a portable media player, or a module/circuitry for one or more of the same.

In a further aspect there is provided a method, the method comprising:

in response to user input, disassociating the linking of the orientation of content with respect to the orientation of a display of a portable electronic device to retain the particular orientation of the content with respect to the orientation of the display during the user input.

In a further aspect there is provided a computer readable medium comprising computer program code stored thereon, the computer readable medium and computer program code being configured to, when run on at least one processor, perform at least the following:

in response to user input, disassociate the linking of the orientation of content with respect to the orientation of a display of a portable electronic device to retain the particular orientation of the content with respect to the orientation of the display during the user input.

In a further aspect there is provided an apparatus, the apparatus comprising:

in response to user input, means for disassociating the linking of the orientation of content with respect to the orientation of a display of a portable electronic device to retain the particular orientation of the content with respect to the orientation of the display during the user input.

In a further aspect there is provided an apparatus comprising a dis-associator;

wherein the dis-associator is configured, in response to user input, to disassociate the linking of the orientation of content with respect to the orientation of a display of a portable electronic device to retain the particular orientation of the content with respect to the orientation of the display during the user input.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which:

FIGS. 6a-6b illustrate a user changing the orientation of a personal electronic device while the device is displaying video content;

DETAILED DESCRIPTION

Figure 1:
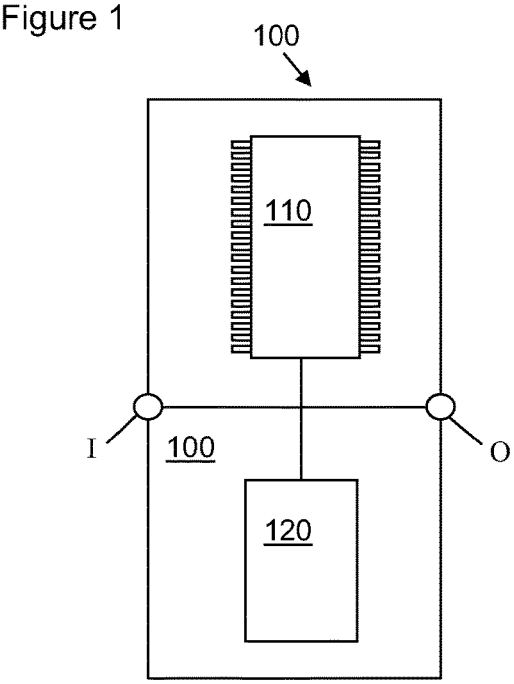
FIG. 1 illustrates an example apparatus according to the present disclosure.

Portable electronic devices often have at least one display for displaying content. A portable electronic device may also be able to determine its orientation. For example, a portable electronic device may include a feature such as a gyroscope so that the device can determine what orientation the display has at any time. Such a device, if oriented with its (rectangular) display in a landscape orientation, may be able to use data from the gyroscope of the device to determine that the display is indeed in a landscape orientation.

Such portable electronic devices may use the determined orientation of a display in order to show content on the display in a particular way. For example, a portable electronic device having a display which is rectangular, with a particular aspect ratio, may be able to determine that it is oriented with its display in a portrait, or upright, orientation. The device may then be able to display content on the display also in a portrait orientation. Further, if the device were to be rotated such that the display was moved from a portrait to a landscape configuration, the device may be able to determine that the display has changed orientation and change how the content is displayed accordingly, that is, change the way the content is displayed so that it is displayed in a landscape configuration, to correspond to the orientation of the display.

This ability of certain portable electronic devices to automatically rotate displayed content to correspond to the orientation of the display of the device can be advantageous. For example, if a user of such a device wishes to change how he or she is viewing content on the display by switching from, for example, a landscape to a portrait orientation, the user can rotate the display from a landscape to a portrait orientation and the device can automatically rotate the displayed content to correspond to the change in orientation of the display, without the need, for example, for the user to enter into a menu system to select a "view content in portrait" option or similar.

The detected rotation or change in orientation of the device need not be from portrait to landscape, that is, a change of 90 degrees rotation in a plane, in order for the device to change the orientation of displayed content in response. For example, a portable electronic device may be configured such that if the display is oriented with a long edge at an angle between 0 degrees and 45 degrees to the gravity vector (which may be defined as the direction of the force of gravity, towards the centre of the Earth), then the device may determine that the display is in a portrait configuration. Conversely, if the display is oriented with a long edge at an angle between 45 degrees and 90 degrees to the gravity vector then the device may determine that the display is in a landscape configuration.

If a user holds their portable electronic device with a long side of the display at an angle of 43 degrees to the gravity vector, for example, a relatively small movement (of four degrees rotation) to rotate the portable electronic device to be such that the long side of the display is at an angle of 47 degrees, may be detected by the device as the display being moved from a portrait to a landscape orientation and the device may re-orient the displayed content correspondingly from portrait to landscape. This may not be desirable for a user if they are, for example, currently performing tasks on the device and the rotation of the device was not intended to cause the reorientation of the content on the display but was the result of, for example, the user not being stationary during use of the device. The user may be walking or travelling in a vehicle while using their device, for example.

Situations may arise where a user does not wish their portable electronic device to always change the orientation of displayed content according to the orientation of the display. For example, a user may receive a telephone call on their mobile telephone (a portable electronic device), and be about to touch the "reply" button displayed on screen. If the user accidentally moves the mobile telephone such that a change in orientation of the display is detected, the device may respond by changing the orientation of the displayed content to match the detected change in orientation of the device. This change in orientation of the content may cause the positioning of the "reply" button on the display to move on the display, and the user may accidentally miss touching the "reply" button, thereby missing the incoming telephone call.

As another example, a user may be sat up on a sofa or bed playing a game, or watching a video, on a portable electronic device. The user may decide to move their position to be more comfortable, for example to lean on one side of the chair or to lie down on their side, but they wish to continue playing the game/watching the video. Such a user may not wish the orientation of the displayed content to be reoriented to an orientation associated with the orientation of the display, since although the orientation of the display has changed with respect to the ground, the orientation of the display with respect to the user's view has not changed orientation, since the user has correspondingly changed their orientation with respect to the display.

Portable electronic devices which are configured to automatically associate the orientation of displayed content with an orientation of the display may allow a user to enter a menu to choose an option of disabling the association. However, it may be that the user, in general, would like the orientation of displayed content to be associated with an orientation of the display, but not, for example, if the user is about to make an input to the device (e.g., to answer a telephone call or to send a text message). The user may not wish to enter a menu system and select/de-select the association of orientation of the display with the orientation of displayed content each time it may be convenient. Further, if the device is, for example, a mobile telephone and an incoming call is being received, the user may not think to, or actually be able to, navigate a menu system to disassociate automatic content orientation from detected display orientation (or the user may be able to navigate such a menu system, but not quickly enough to also answer the incoming call). The user would simply wish to answer the call. The user may not even wish to make a conscious decision to ensure that the displayed content does not reorient if the display is detected to have changed orientation. The user may find it beneficial if the device were able to detect that the user was about to, or was likely to, interact with the displayed content and therefore ensure that the displayed content does not change position on the screen, for example as a result of the displayed content being reoriented on the display if a detected change in orientation of the display is detected.

FIG. 1 shows an apparatus 100 comprising a processor 110, memory 120, input 1 and output 0. In this embodiment only one processor and one memory are shown but it will be appreciated that other embodiments may utilize more than one processor and/or more than one memory (e.g., same or different processor/memory types). The apparatus 100 may be an application specific integrated circuit (ASIC) for a portable electronic device. The apparatus 100 may also be a module for a device, or may be the device itself, wherein the processor 110 is a general purpose CPU and the memory 120 is general purpose memory.

The input I allows for receipt of signaling to the apparatus 100 from further components. The output 0 allows for onward provision of signaling from the apparatus 100 to further components. In this embodiment the input I and output 0 are part of a connection bus that allows for connection of the apparatus 100 to further components. The processor 110 is a general purpose processor dedicated to executing/processing information received via the input I in accordance with instructions stored in the form of computer program code on the memory 120. The output signaling generated by such operations from the processor 110 is provided onwards to further components via the output 0.

The memory 120 (not necessarily a single memory unit) is a computer readable medium (such as solid state memory, a hard drive, ROM, RAM, Flash or other memory) that stores computer program code. This computer program code stores instructions that are executable by the processor 110, when the program code is run on the processor 110. The internal connections between the memory 120 and the processor 110 can be understood to provide active coupling between the processor 110 and the memory 120 to allow the processor 110 to access the computer program code stored on the memory 120.

In this embodiment the input I, output 0, processor 110 and memory 120 are electrically connected internally to allow for communication between the respective components 1, 0, 110, 120, which in this example are located proximate to one another as an ASIC. In this way the components 1, 0, 110, 120 may be integrated in a single chip/circuit for installation in an electronic device. In other embodiments one or more or all of the components may be located separately (for example, throughout a portable electronic device such as devices 200, 300, or through a "cloud", and/or may provide/support other functionality.

Figure 2:
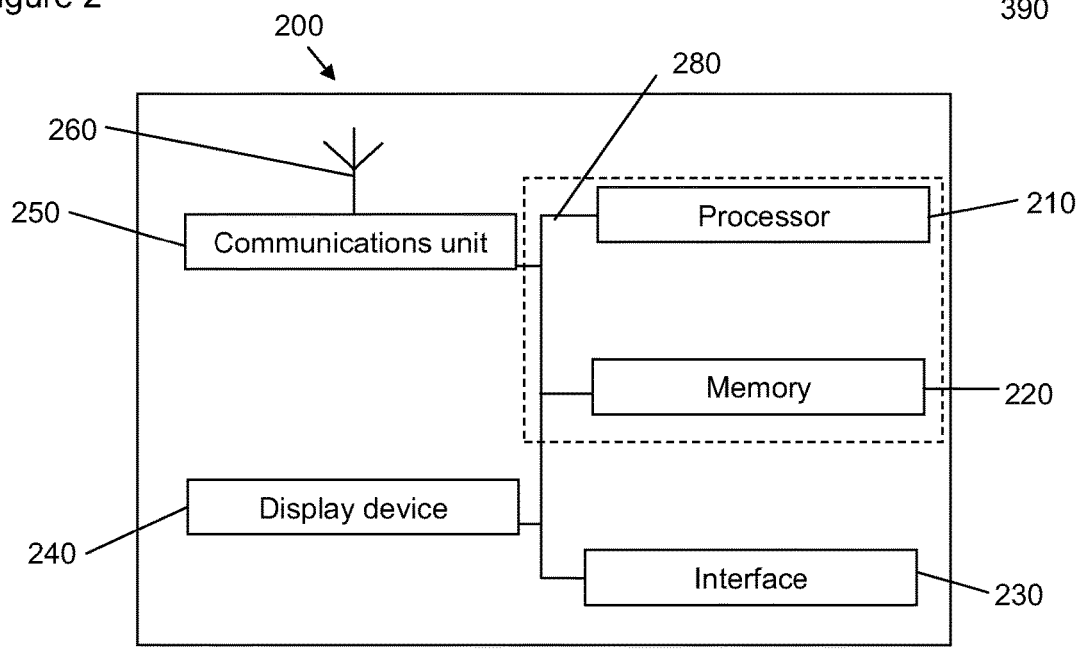
FIG. 2 illustrates another example apparatus according to the present disclosure.

One or more examples of the apparatus 100 can be used as a component for another apparatus as in FIG. 2, which shows a variation of apparatus 100 incorporating the functionality of apparatus 100 over separate components. In other examples the device 200 may comprise apparatus 100 as a module (shown by the optional dashed line box) for a mobile phone or PDA or audio/video player or the like. Such a module, apparatus or device may just comprise a suitably configured memory and processor.

The example apparatus/device 200 comprises a display 240 such as, a Liquid Crystal Display (LCD), e-Ink, or touch-screen user interface. The device 200 is configured such that it may receive, include, and/or otherwise access data. For example, device 200 comprises a communications unit 250 (such as a receiver, transmitter, and/or transceiver), in communication with an antenna 260 for connection to a wireless network and/or a port (not shown). Device 200 comprises a memory 220 for storing data, which may be received via antenna 260 or user interface 230. The processor 210 may receive data from the user interface 230, from the memory 220, or from the communication unit 250. Data may be output to a user of device 200 via the display device 240, and/or any other output devices provided with apparatus. The processor 210 may also store the data for later user in the memory 220. The device contains components connected via communications bus 280.

The communications unit 250 can be, for example, a receiver, transmitter, and/or transceiver, that is in communication with an antenna 260 for connecting to a wireless network and/or a port (not shown) for accepting a physical connection to a network, such that data may be received via one or more types of network. The communications (or data) bus 280 may provide active coupling between the processor 210 and the memory (or storage medium) 220 to allow the processor 210 to access the computer program code stored on the memory 220.

The memory 220 comprises computer program code in the same way as the memory 120 of apparatus 100, but may also comprise other data. The processor 210 may receive data from the user interface 230, from the memory 220, or from the communication unit 250. Regardless of the origin of the data, these data may be outputted to a user of device 200 via the display device 240, and/or any other output devices provided with apparatus. The processor 210 may also store the data for later user in the memory 220.

Device/apparatus 300 may be an electronic device (including a tablet personal computer), a portable electronic device, a portable telecommunications device, or a module for such a device. The apparatus 100 can be provided as a module for device 300, or even as a processor/memory for the device 300 or a processor/memory for a module for such a device 300. The device 300 comprises a processor 385 and a storage medium 390, which are electrically connected by a data bus 380. This data bus 380 can provide an active coupling between the processor 385 and the storage medium 390 to allow the processor 380 to access the computer program code.

Figure 3:
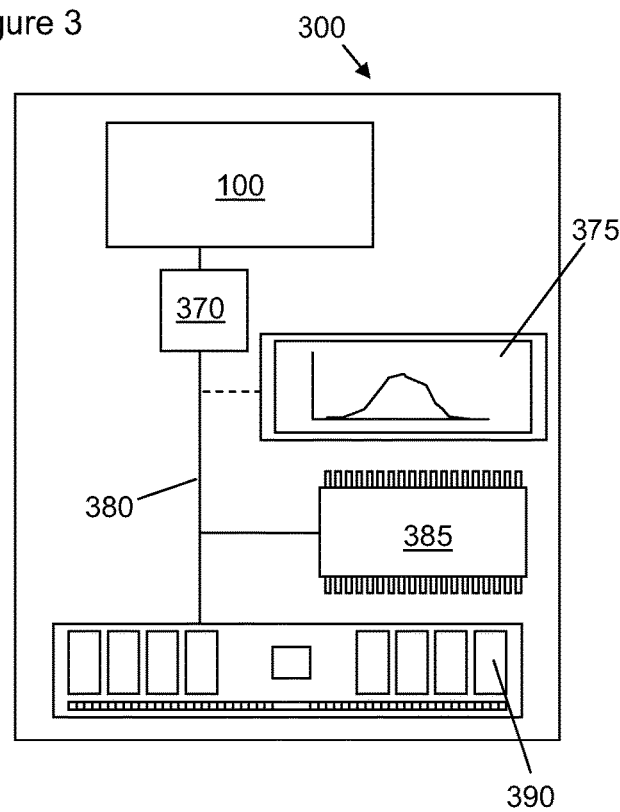
FIG. 3 illustrates another example apparatus according to the present disclosure.

The apparatus 100 in FIG. 3 is electrically connected to an input/output interface 370 that receives the output from the apparatus 100 and transmits this to the device 300 via data bus 380. Interface 370 can be connected via the data bus 380 to a display 375 (touch-sensitive or otherwise) that provides information from the apparatus 100 to a user. Display 375 can be part of the device 300 or can be separate. The device 300 also comprises a processor 385 configured for general control of the apparatus 100 as well as the device 300 by providing signaling to, and receiving signaling from, other device components to manage their operation.

The storage medium 390 is configured to store computer code configured to perform, control or enable the operation of the apparatus 100. The storage medium 390 may be configured to store settings for the other device components. The processor 385 may access the storage medium 390 to retrieve the component settings in order to manage the operation of the other device components. The storage medium 390 may be a temporary storage medium such as a volatile random access memory. The storage medium 390 may also be a permanent storage medium such as a hard disk drive, a flash memory, or a non-volatile random access memory. The storage medium 390 could be composed of different combinations of the same or different memory types.

Figure 4A:
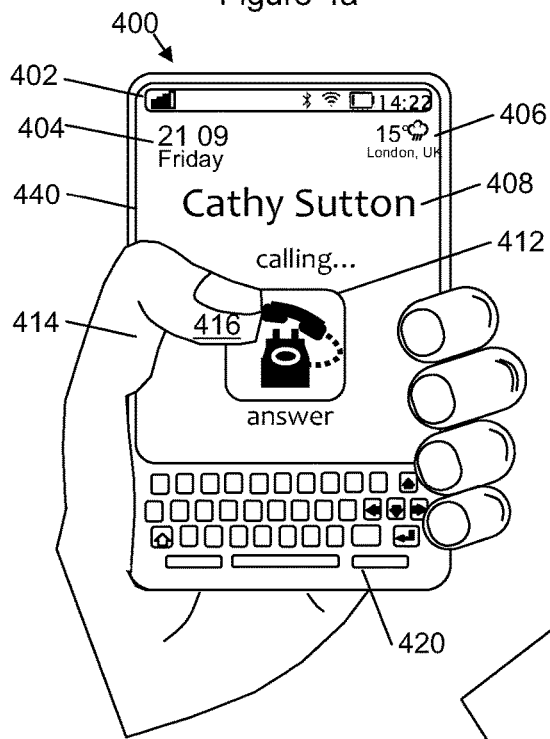
FIGS. 4a-4c illustrate a user changing the orientation of a personal electronic device while receiving an incoming call on the device.
Figure 4B:
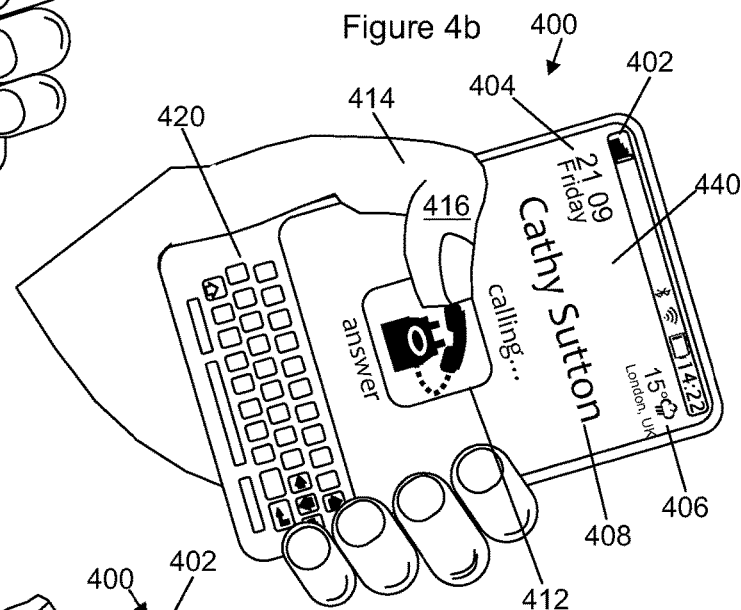
Figure 4C:
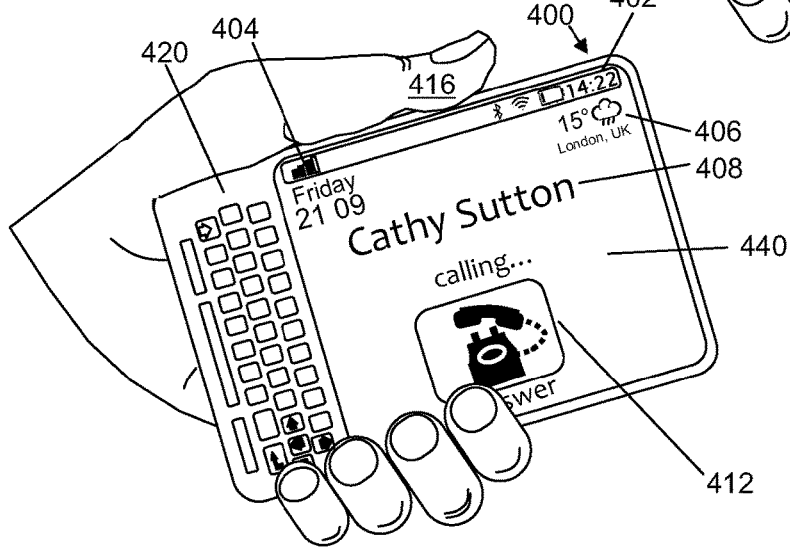

FIGS. 4a-4c illustrate an example embodiment of the apparatus which is a portable electronic device 400, such as a smartphone or PDA, in use. The device 400 in this example is capable of receiving telephone calls as well as having other functionality. The device 400 has a physical keyboard 420 and a display 440 which is proximity-sensitive, that is, it is able to detect the presence of objects in proximity to the surface of the display. In proximity may be within a distance of, for example, 2 mm from the surface of the display. Such a proximity-sensitive display may be a capacitive sensing display, or other suitable display as known in the art. The display 400, as well as having proximity sensitivity, is also touch sensitive, that is, it is able to detect objects touching the surface of the display.

The display 440 is able to detect an object in proximity to the display as a different type of input to detecting an object which is touching the screen. For example, the display 440 may be able to detect a hover input as a user input for response, causing the disassociation of the linking of the orientation of content 402, 404, 406, 408, and 412 with respect to the orientation of a display 440. The display 440 may also be able to detect a touch input, as a selection input, to select a function associated with the touched region. For example, touching an application icon may perform the function of opening an application associated with the touched icon, or as another example, touching the "play" button on a music player widget may perform the function of playing a song. As a further example, touching a text field may perform the function of displaying a virtual keyboard such that text may be entered in the text field.

The device 400 in this example is displaying information on the operation of the device in a status bar 402 such as the signal strength, Bluetooth® connectivity, network connectivity, battery power remaining, and the current local time. The device is also displaying other general information including the date and day 404, and the location and local weather conditions 406 of the device.

In FIG. 4a, the device is oriented such that the display 440 is in a portrait orientation. The orientation of content 402, 404, 406, 408, and 412 on the display 440 is associated with the orientation of the display 440, in that it is also being displayed in a portrait configuration. The device 400 in FIG. 4a is receiving an incoming telephone call from a contact 408 which the user may answer by selecting the displayed answer button 412. In FIG. 4a, the user is about to select the answer button 412 by touching it with his thumb 416. FIG. 4a shows that the user's thumb 416 is about to touch the answer button 412 and is therefore hovering over the answer button 412 in proximity to the display 440.

The proximity-sensitive display is able to detect that the user's thumb 416 (or any other object), is in proximity to the surface of the proximity-sensitive display 440 of the device 400. Therefore, in response to this user input 414 of a user hovering his thumb 416 over the proximity-sensitive display 440, the portable electronic device 400 disassociates the linking of the orientation of content 402, 404, 406, 408, 412 with respect to the orientation of the display 440 of the portable electronic device, to retain the particular orientation of the content 402, 404, 406, 408, 412 with respect to the orientation of the display 440 during the user input 414. This is seen in FIG. 4b.

In FIG. 4b, the user has rotated the device while providing a user input, so that the display, which was in a portrait configuration in FIG. 4a, is in a substantially landscape orientation. It may be that the device is configured to determine the orientation of the display 440 of the device 400 by using data received from an accelerometer, a gyroscope or a magnetometer. Other ways in which the apparatus is able to determine the orientation of the display are known in the art and included within the scope of this disclosure.

It may be that the apparatus is able to determine the orientation of the display of the portable electronic device by comparing the detected orientation with the gravity vector (defined as pointing towards the centre of the Earth). The apparatus may determine that the orientation of the display is in a portrait orientation if, for example, the long side of the display. is between an angle of 0 and 45 degrees with respect to the gravity vector, and may determine that the orientation of the display is in a landscape orientation if, for example, the long side of the display is between an angle of 45 and 90 degrees with respect to the gravity vector. Therefore, the orientation of the display shown in FIG. 4*a* may be determined to be in a portrait configuration, and the orientation of the display shown in FIGS. 4*b* and 4*c* may be determined to be in a landscape configuration.

The orientation of the display may be detected by the comparison of an axis (for example, the longitudinal axis) of the (rectangular) display with the gravity vector. In this way, the orientation of the display of a device may be determined, in some examples, in three dimensions. That is, the orientation of the plane of the display may change with respect to ground level (i.e. is the display held upright, or led flat, for example, on a table), and the orientation of the plane of the substantially vertical display may change in a vertical two-dimensional plane (i.e. is the device held in a portrait or landscape orientation), and such changes may be detected. In other example, it may be that the orientation of the plane of the substantially vertical display may change in a vertical two-dimensional plane but that the orientation of the display with respect to ground level is not detected.

In FIG. 4*b* the user is hovering his thumb 416 over the proximity-sensitive display 440 as in FIG. 4*a*, thereby providing the user input 414. The device has disassociated the linking of the orientation of content 402, 404, 406, 408, and 412 with respect to the orientation of the display 440 of the portable electronic device due to the user input 414. The particular orientation of the content 402, 404, 406, 408, and 412 is therefore retained with respect to the orientation of the display 440 during the user input 414. The content 402, 404, 406, 408, and 412 is displayed oriented relative to the display in the same way as in FIG. 4*a*, when the display was oriented in a portrait orientation, since the user input has been provided during the movement/re-orientation of the device shown between FIGS. 4*a* and 4*b*. The display 440 of the device 400 as shown in FIG. 4*b* is determined by the apparatus to be in a landscape orientation due to being rotated from the position of the device is FIG. 4*a*; however, due to the disassociation of the linking of the orientation of content 402, 404, 406, 408, and 412 with respect to the orientation of the display 440 of the portable electronic device, the content 402, 404, 406, 408, and 412 is still being displayed in a portrait orientation.

In FIG. 4*c*, the user has moved his thumb 416 away from being proximal to the proximity-sensitive display to being at the side of the device 400. This movement of the thumb away from the display, so that there is no object detected proximal to the display 440, has terminated the user input 414. Thus the orientation of the content 402, 404, 406, 408, and 412 on the display 440 of the portable electronic device 400 is re-associated with the orientation of the display 440 so that the content is displayed in a landscape orientation, to match the landscape orientation of the display of the portable electronic device.

Consider an example wherein no disassociation between the linking of the orientation of the content and the orientation of the display can occur due to a user input. If the user were to respond to the incoming call by selecting the answer button 412, for example by using his thumb 416 to touch the button 412, and if the device associates the orientation of the content on the display 440 with the orientation of the display 440, then the user may not have touched the button if the display is rotated between two orientations as shown for example in FIGS. 4*a* and 4*b*. The position of the displayed button 412 would have moved due to the reorientation of the displayed content upon rotation of the display 440, so the user may have missed answering the call.

However in this embodiment, in response to the user input 414, the orientation of the content with respect to the orientation of the display was disassociated due to the user input 414, as shown in FIG. 4*b*. Thus the particular orientation of the content with respect to the orientation of the display 440 was retained due to the user input 414. The user, even though he has changed the orientation of the display, upon touching the screen, still touches the answer button 414 and is able to answer the incoming call.

It will be appreciated that the two angular positions shown in FIG. 4*a*, and in FIGS. 4*b* and 4*c*, are very different, but that the difference in orientation required to cause the apparatus to detect that the display has changed orientation from, for example, portrait to landscape need not be such a large difference. A large difference is shown in FIGS. 4*a*-4*c* for clarity.

The user input 414 in this embodiment is detected during use of the telephone/supplementary application of the calling application. It will be appreciated that the user input may be detected during use of a different particular supplementary application; for example during the use of a calling/telephone application, text message application, e-mail application, video application, audio application, word processing or other productivity application, game, social media application, internet browser, contact list application, calendar application, photo application, calculator application, or other application. It may be that the user input is detected during display of a home screen of the device.

In this example, the detection of an object static or moving, proximal to any part of the surface of the proximity-sensitive display, is registered by the apparatus as a user input for the portable electronic device.

In other examples it may be that the detection of an object proximal to one or more user interface elements 412 displayed on the proximity-sensitive display 440 of the portable electronic device 440 is registered as a user input. In this example if the user hovers a finger over a region of the proximity-sensitive display 440 which is not identified as a corresponding to the display of a user interface element 412, then no user input may be detected which would cause the disassociation of the linking of the orientation of content with respect to the orientation of the display of the device 400. For example, only the user interface elements such as buttons 412 or icons (or other displayed element which may be interacted with by a user) may respond to a user input made to cause disassociation. Other example user interface elements may include forms (such as a search engine application widget or a text entry form), hyperlinks in a document or website, sliders, scroll bars, or other virtual controllers, or other interactive displayed elements.

In still other examples it may be that the detection of an object proximal to a region not overlying one or more user interface elements displayed on the proximity-sensitive display of the portable electronic device is registered as a user input which would cause the disassociation of the linking of the orientation of content with respect to the orientation of the display of the device 400. In this example if the user hovers a finger over a region of the proximity-sensitive display 440 which is not identified as a corresponding to the display of a user interface element 412, then a user input is detected to cause the disassociation. Conversely in this example if the user hovers a finger over a region of the proximity-sensitive screen which is overlying/corresponding to a user interface element, then no user input is detected and no disassociation takes place.

Figure 5A:
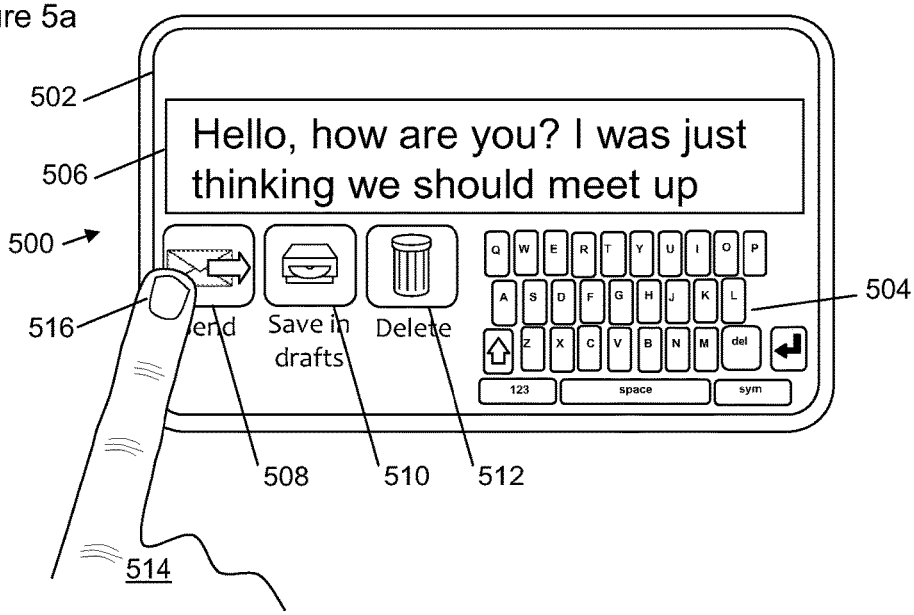
FIGS. 5a-5c illustrate a user changing the orientation of a personal electronic device while composing a textual message using the device.
Figure 5B:
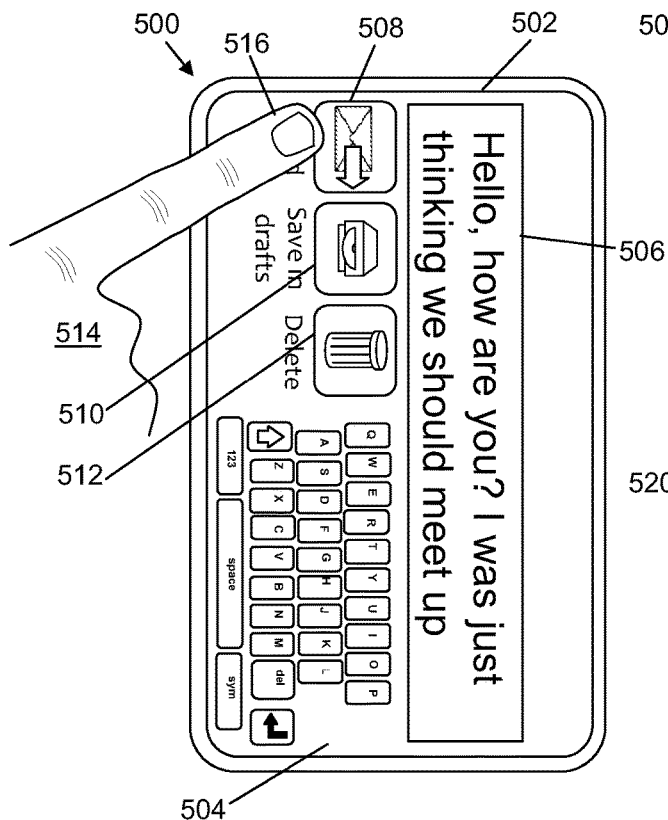
Figure 5C:
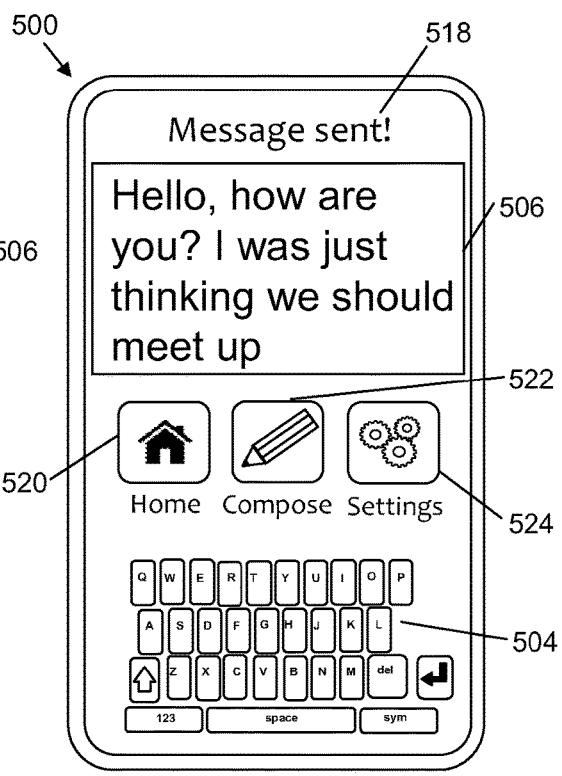

FIGS. 5a-5c illustrate an example embodiment of the apparatus which is a portable electronic device 500, such as a smartphone, tablet computer, touch sensitive display or PDA, in use. The device 500 in this example is capable of sending e-mails, and is displaying a virtual keyboard 504. The device 500 has a proximity-sensitive and touch-sensitive display 502. The display 502 is able to detect an object in proximity to the display as a different type of input to detecting an object touching the screen. For example, a hover input may be recognized by the apparatus as an input to cause the disassociation of the linking of the orientation of content with respect to the orientation of a display of the portable electronic device 500 to retain the particular orientation of the content with respect to the orientation of the display during the hover user input. A touch input may be recognized differently to a hover input as an input to select a function associated with the touched region, for example for the actuation of a user interface element. For example, touching an application icon may cause the associated application to be opened, or maximized, or brought to the front of the displayed elements.

The device 500 in this example is running an e-mailing application and is accordingly displaying a message region 506, virtual keyboard 504, and option buttons 508, 510, 512 to allow a user to interact with the application and in this example, compose and transmit a message to a contact. The options shown are exemplary and others may be envisaged. The example options displayed in FIG. 5a allow the user to send 508 a message, save 510 a message in a drafts folder, and delete 512 a message. Although in this example an e-mailing application is illustrated, the application could, for example, be an SMS/MMS/fax message application, an internet browser displaying a website allowing a user to enter text, or any other application where a user can enter (and transmit) text.

In FIG. 5a, the device is oriented such that the display 502 is in a landscape orientation. The orientation of content 504, 506, 508, 510, and 512 on the display 502 is associated with the orientation of the display 502, in that the content is also being displayed in a landscape configuration. The user 514 in FIG. 5a has just finished composing a message as shown in the message region 506, and would like to send that message to a contact. The user 514 is shown as about to select the send button 508, so his finger 516 is hovering proximal to the send button 508 displayed on the proximity sensitive display 502. Touching the send button 508 would cause the apparatus to transmit the composed message.

The proximity-sensitive display 502 is able to detect the user's finger 516 in proximity to the surface of the proximity-sensitive display 502 of the device 500 as a user input. In response to this user input, the apparatus performs the disassociation of the linking of the orientation of content 504, 506, 508, 510, 512 with respect to the orientation of the display 502 of the portable electronic device 500, to retain the particular orientation of the content 504, 506, 508, 510, 512 with respect to the orientation of the display 502 during the user input. This is seen in FIG. 5b.

In FIG. 5b, the device has changed orientation by being rotated so that the display, which was in a landscape configuration in FIG. 5a, is now in a portrait orientation The user is still hovering his finger 516 over the send button 508 displayed on the proximity-sensitive display 502 as in FIG. 5a, and is thereby still providing the user input for response. Due to this user input, the device 500 has disassociated the linking of the orientation of content 504, 506, 508, 510, and 512 with respect to the orientation of the display 502 of the portable electronic device 500. The particular orientation of the content 504, 506, 508, 510, 512, landscape in this example, is retained with respect to the orientation of the display 502, also landscape, during the user input, even though now in FIG. 5b, the device is in a portrait configuration. The content 504, 506, 508, 510, 512 is displayed oriented relative to the display in the same way as in FIG. 5a, when the display was oriented in a landscape orientation. The display 502 of the device 500 as shown in FIG. 5b is determined by the apparatus to be in a portrait orientation due to being rotated from the position of the device is FIG. 5a; however, due to the disassociation of the linking of the orientation of content 504, 506, 508, 510, 512 with respect to the orientation of the display 502, the content 504, 506, 508, 510, 512 is still being displayed in the same way with respect to the display as in FIG. 5a.

In FIG. 5c, the user 514 has tapped the send button 508 with his finger 516 to transmit the composed message, and after tapping the send button 508, he has moved his finger away from being proximal to the display 502. Therefore the user input has been terminated in FIG. 5c by the user tapping the send button 508 on the display 502 of the portable electronic device 500. Thus the orientation of the content 504, 506, 508, 510, and 512 on the display 502 of the portable electronic device 500 has been re-associated with the orientation of the display 502 due to the user input termination. Since the user input has been terminated, the apparatus displays the content 504, 506, 508, 510, and 512 in a portrait orientation to correspond to the orientation of the display 502, which is also in a portrait configuration.

It can be seen that, since the user has selected the send message 508 button and the message has been transmitted 518, the displayed (example) options in FIG. 5c are different to those shown before the message was transmitted. FIG. 5c shows the example menu options as buttons allowing a user to go to the home screen 520, compose a new message 512, or go to the settings menu 524 of the e-mail application.

If no disassociation between the orientation of the content and the orientation of the display occurred due to a user input, then upon a reorientation of the display 502 as shown in FIG. 5b, the orientation of displayed content would also have changed to correspond to the new orientation of the display. If this had occurred, then the user would not have touched the send button 508 if the displayed content had changed orientation. The user would have touched a different region of the display, which would have no longer corresponded to the location of the send button, since the orientation of the displayed content with respect to the orientation of the device changed between FIGS. 5a and 5b. It may be considered undesirable for the positioning of user interface elements such as buttons, icons or other selectable options, for example, to move their positions relative to the display if the user is about to select one of those user interface elements.

In this example, in response to the user input, the linking of the orientation of the content with respect to the orientation of the display was disassociated due to the user input, as shown in FIG. 5b. Thus the particular orientation of the content with respect to the orientation of the display 502 was retained due to the user input. The user, even though he has changed the orientation of the display 502, upon touching the display, still touches the send button 508 and is able to transmit the message without inadvertently tapping another area of the screen, which may, for example, cause the selection of a different button or cause a different action which was not intended by the user.

In the embodiment of FIGS. 5a-5c, the user input is detected during use of the particular supplementary application of the e-mail application. It may be envisaged in other examples that the user may be about to select an icon or option on the home screen or desktop of a portable electronic device, rather than select a button in a particular supplementary application. An advantage may be perceived by a user of an apparatus/device which is configured to detect a user input such as a detecting a hovering finger or thumb over a proximity-sensitive screen. The portable electronic device 500 may be configured to associate the orientation of content (for example, the positioning and orientation of icons displayed on a home screen) on a display of the portable electronic device with the orientation of the display, but in this example, in response to the user input, the device is configured to disassociate the linking of the orientation of content with respect to the orientation of the display to retain the particular orientation of the content with respect to the orientation of the display during the user input. Therefore if the device were to detect a change in orientation of the device just before the user selects an icon on the home screen, the orientation of the content of the home screen would not re-orient and the user would not miss touching the intended region of the screen corresponding to the icon of interest.

User inputs for response may be provided to particular locations on a display or particular locations situated on the device/apparatus other than the display. For example, a user input may be provided to a device/apparatus configured to receive input from particular locations on the sides of the device/apparatus. The one or more particular locations on the sides of the device would be designated to provide for disassociation of the linking of the orientation of content with respect to the orientation of the display. When a user is holding the device/apparatus in their hand, the user's fingers touching/pressing one or more particular predesignated locations on the side of the device/apparatus may be detected as user input causing disassociation. Such user input may then cause the device/apparatus to disassociate the linking of the orientation of content (e.g., icons, text, images) with respect to the orientation of the display to retain the particular orientation of the content with respect to the orientation of the display during the user input.

Another example of a user input which may cause a device/apparatus to disassociate the linking of the orientation of content with respect to the orientation of the display is, for example, if the user is performing a particular gesture or moving their finger in a particular way with respect to a proximity or touch sensitive region of the device/apparatus. The user may be able to, for example, trace a form, or move a finger in a particular way on the device/apparatus to cause it to disassociate the linking of the orientation of content with respect to the orientation of the display during this input.

FIGS. 6a-6b illustrate an example embodiment of the apparatus which is a portable electronic device 600, such as a smartphone or PDA in use. The device 600 in this example is capable of displaying video content, outputting/receiving audio content, receiving telephone calls, as well as other functionality. In this example, the user is conducting a video chat with a contact, whereby they can speak to and hear the contact, they can see a live video of the contact speaking to them, and the contact can also see a live video of the user.

The device 600 has a display 602, a camera 604, a microphone (not shown), a speaker (not shown), and is capable of detecting changes in pressure applied to the edges of the device and converting such changes in pressure into input signals. Such changes in pressure may arise by a user squeezing the edges of the device while holding it. The device may also accept user input made in other ways, such as, for example, by a user touching the display (if the device comprises a touch-sensitive display), by hovering proximal to the display (if the device comprises a proximity-sensitive display), or by a user manipulating physical controls (for example, if the device comprises a physical volume slider/dial control, or a physical on/off/standby button).

The device 600 in this example is displaying some options available to the user in an option bar 606. Such options may allow, for example, a user to navigate to the home screen, allow a user to access a messaging application, allow a user to access a calendar application, allow a user to access a chat application, or allow the user to refresh the displayed content. Other example options may be envisaged.

In FIG. 6a, the device is oriented such that the display 602 is in a portrait orientation. The orientation of content 608 on the display 602 is associated with the orientation of the display 602, as it is also displayed in a portrait configuration. The device 600 in FIG. 6a is currently running a video chat application, so audio and video input is being input and output. The external contact can see a live video of the user of the device 600 due to the built-in camera 602 which may record video input of the user. The user for example, may be holding the device in front of his face for the external user to see him and so that he can see the video output of the contact. It may be imagined in other examples that the user is watching a movie on the device 600, or is playing a video game using the device 600.

The user in FIG. 6a is in an upright position, for example, they may be stood up or sat up in a chair. The user in this example decides during the video chat to move from their upright position and lie on their side, for example on a bed or settee/sofa. The user (holding the device) does not want the displayed content 608 to automatically change orientation upon the device 600 rotating from a portrait to a substantially landscape orientation due to the user lying on their side, because although the orientation of the display with respect to ground level will change upon the user changing position, the orientation of the display with respect to the point of view of the user will not change.

The device in this example is configured to associate the orientation of content on the display 602 of the portable electronic device 600 with the orientation of the display 600, and thus upon the device 600 being rotated from portrait to substantially landscape, as shown from FIG. 6a to FIG. 6b, the orientation of the displayed content could also change from being in a portrait (as shown in FIG. 6a) to being in a landscape configuration. This is undesirable for the user since, in this example, it is not only the device and display which are changing orientation but the user also, who is moving from an upright to a more horizontal position. The user would therefore be viewing their contact "sideways on" during the video chat while the user was led on their side if the content was re-oriented due to the orientation of the display changing with respect to ground level (or to a gravity vector, or other reference other than the user's point of view).

Since the user is in the middle of a video chat, they may not wish to change the settings of the device, which may require the user to navigate a menu system and therefore leave the video chat, to prevent any automatic rotation/re-orientation of the displayed content due to the display changing orientation.

In this example, the user is able to provide a user input 612 by squeezing the sides of the device, and in response to this user input 612 the apparatus disassociates the linking of the orientation of the displayed video content 608 with respect to the orientation of the display 602 of the portable electronic device 600, to retain the particular orientation of the content 608 with respect to the orientation of the display 602 during the user input 612. Therefore the user is able to move between sitting up and reclining/lying on their side, and back again if they wish to, and by providing a suitable user input 612, the orientation of the displayed content with respect to the angle of view of the user is retained. Thus the user 610 can view the displayed contact person in the expected orientation by providing a user input during viewing of the video content.

The two angular positions shown in FIGS. 6a and 6b are very different, but the difference in orientation required to cause the apparatus to detect that the display has changed orientation from, for example, portrait to landscape need not be such a large difference.

The user input 612 for the portable electronic device 600 in this embodiment is detected during use of the particular supplementary application of the video chat application, but in other examples the viewed video content may be from the user watching a movie or other image-based broadcast, or the user may be playing a game. For example, if the user if playing a game on their portable electronic device and wish to move between sitting upright and a reclining position, they may not wish the displayed content to be oriented to correspond to the orientation of the display if the user themselves is also changing orientation.

In the embodiment shown in FIGS. 6a and 6b, the detection of a squeeze input from the user on the sides of the device provides the user input. Other exemplary user inputs include squeezing only one particular side (that is, a particular location designated to provide for disassociation) of the device, pressing or touching at one or more particular locations on the back of the device (if the device is configured to receive inputs via the back of the device), or by the user bending part of the device (if the device is a flexible portable electronic device and configured to receive user input via being deformed/bent).

Figure 7:
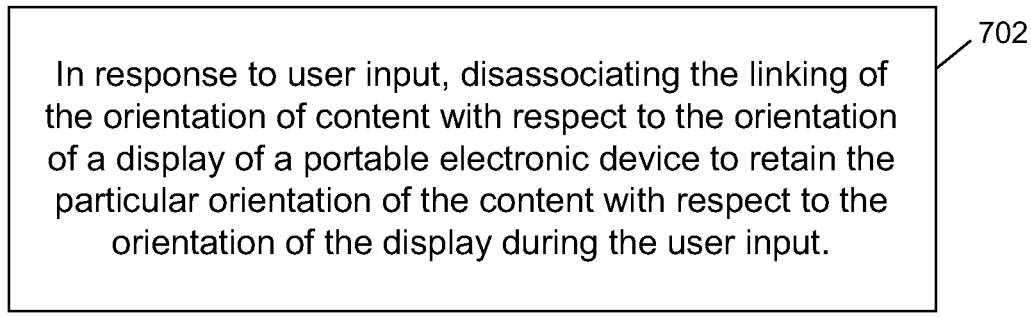
FIG. 7 illustrates a flowchart according to a method of the present disclosure.

FIG. 7 shows a flow diagram illustrating the step of, in response to user input, disassociating the linking of the orientation of content with respect to the orientation of a display of a portable electronic device to retain the particular orientation of the content with respect to the orientation of the display during the user input 702, and is self-explanatory.

Figure 8:
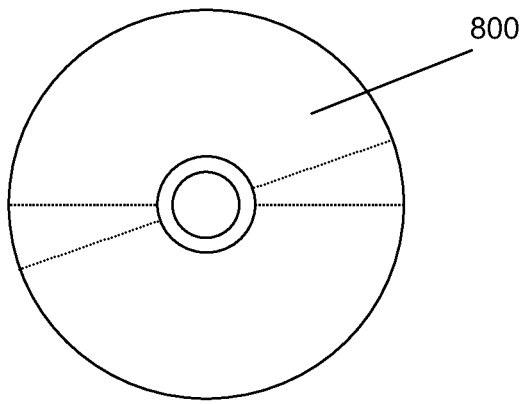
FIG. 8 illustrates schematically a computer readable medium providing a program.

FIG. 8 illustrates schematically a computer/processor readable medium 800 providing a program according to an embodiment. In this example, the computer/processor readable medium is a disc such as a digital versatile disc (DVD) or a compact disc (CD). In other embodiments, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

The apparatus may comprise a dis-associator. The dis-associator may comprise hardware and/or software, and be configured to, in response to user input, disassociate the linking of the orientation of content with respect to the orientation of a display of a portable electronic device to retain the particular orientation of the content with respect to the orientation of the display during the user input for the apparatus.

Any mentioned apparatus/device and/or other features of particular mentioned apparatus/device may be provided by apparatus arranged such that they become configured to carry out the desired operations only when enabled, e.g., switched on, or the like. In such cases, they may not necessarily have the appropriate software loaded into the active memory in the non-enabled (e.g., switched off state) and only load the appropriate software in the enabled (e.g., on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g., memory, signal).

Any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

The term "signaling" may refer to one or more signals transmitted as a series of transmitted and/or received electrical/optical signals. The series of signals may comprise one or more individual signal components or distinct signals to make up said signaling. Some or all of these individual signals may be transmitted/received by wireless or wired communication simultaneously, in sequence, and/or such that they temporally overlap one another.

With reference to any discussion of any mentioned computer and/or processor and memory (e.g., including ROM, CD-ROM, etc.), these may comprise a computer processor, application specific integrated circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

That which is claimed:

1. An apparatus comprising:
   at least one processor; and
   at least one memory comprising computer program code,
   the at least one memory and the computer program code configured to, with the at least one processor, cause the apparatus to perform at least the following:
   in response to detecting an object hovering over a touch display of a portable electronic device, temporarily disassociate the linking of orientation of content with respect to the orientation of the display of the portable electronic device to retain the orientation of the content with respect to the orientation of the display during a duration that the object hovers over the touch display, and to prevent rotation of the content during the duration of the object hovering over the touch display; and
   in response to detecting removal of the object hovering over the touch display of the portable electronic device, re-associate the linking of the orientation of content with respect to the orientation of the display of the portable electronic device such that the rotation is performed in response to a change in the orientation of the display.

2. The apparatus of claim 1, wherein the apparatus is configured to detect hovering objects during use of one or more of a particular supplementary application of the portable electronic device or a home screen of the portable electronic device.

3. The apparatus of claim 2, wherein the particular supplementary application is one or more of a calling/telephone application, text message application, e-mail application, video application, audio application, word processing or other productivity application, game, social media application, internet browser, contact list application, calendar application, photo application or calculator application.

4. The apparatus of claim 1, wherein the apparatus is configured to detect hovering objects proximal to a proximity-sensitive display of the portable electronic device.

5. The apparatus of claim 1, wherein the apparatus is configured to detect removal of the object hovering over the touch display of the portable electronic device by detecting movement of the object away from the touch display so as to no longer be proximal thereto.

6. The apparatus of claim 1, wherein the apparatus is configured to detect hovering objects only in regions at least partly overlying one or more user interface elements displayed on a proximity-sensitive display of the portable electronic device,
   and the apparatus is further configured to, in response to
      a touch input at the touch display at least partly overlying the one or more user interface elements, identify a function associated with the touched region of the touch display.

7. The apparatus of claim 6, wherein the touch input comprises one or more of a tap, a swipe, a slide, a press, a hold, a rotate gesture, bending at least part of the portable electronic device, squeezing at least part of the portable electronic device or a multi-finger gesture.

8. The apparatus of claim 6, wherein the one or more user interface elements comprises one or more of a button, an icon, a form, a widget, a hyperlink, a slider, a scroll bar, or a virtual control element.

9. The apparatus of claim 1, wherein the apparatus is configured to detect the object hovering over the touch display only in an instance the object hovering is proximal to a region not overlying one or more user interface elements displayed on a proximity-sensitive display of the portable electronic device.

10. The apparatus of claim 1, wherein the apparatus is configured to detect hovering objects at one or more particular locations on the portable electronic device, the one or more particular locations being designated to provide for disassociation of the linking of the orientation of content with respect to the orientation of the display.

11. The apparatus of claim 1, wherein the detection of the object hovering over the touch display is characterized by one or more of a static hover proximal to the portable electronic device, a moving hover proximal to the portable electronic device, or a multi-finger gesture.

12. The apparatus of claim 1, wherein the apparatus comprises one or more of an accelerometer, a gyroscope, or a magnetometer to detect the orientation of the display.

13. The apparatus of claim 1, wherein the orientation of the display is defined with respect to a gravity vector.

14. The apparatus of claim 1, wherein the apparatus is a portable electronic device, a laptop computer, a mobile phone, a Smartphone, a tablet computer, a personal digital assistant, a digital camera, a watch, a server, a portable media player, a module, or circuitry.

15. The method of claim 1, wherein the temporary disassociation to retain the orientation of the display and prevent rotation of the content during the duration of the object hovering over the touch display occurs responsive to detecting the object hovering over any portion of the touch display and independently of any predefined regions.

16. A method comprising:
  in response to detecting an object hovering over a touch display of a portable electronic device, temporarily disassociating the linking of orientation of content with respect to the orientation of the display of the portable electronic device to retain the orientation of the content with respect to the orientation of the display during a duration that the object hovers over the touch display, and to prevent rotation of the content during the duration of the object hovering over the touch display; and
  in response to detecting removal of the object hovering over the touch display of the portable electronic device, re-associating the linking of the orientation of content with respect to the orientation of the display of the portable electronic device such that the rotation is performed in response to a change in the orientation of the display.

17. The method of claim 16, wherein the detection of the object hovering over the touch display occurs during use of one or more of a particular supplementary application of the portable electronic device or a home screen of the portable electronic device.

18. The method of claim 16, further comprising detecting removal of the object hovering over the touch display of the portable electronic device by detecting movement of the object away from the touch display so as to no longer be proximal thereto.

19. The method of claim 16, further comprising:
  detecting hovering objects only in regions at least partly overlying one or more user interface elements displayed on a proximity-sensitive display of the portable electronic device; and
  in response to a touch input at the touch display at least partly overlying the one or more user interface elements, identify a function associated with the touched region of the touch display.

20. The method of claim 16, wherein the object hovering over the touch display is detected only in an instance the object hovering is proximal to a region not overlying one or more user interface elements displayed on a proximity-sensitive display of the portable electronic device.

21. A non-transitory computer readable medium comprising computer program code stored thereon, the computer readable medium and computer program code being configured to, when run on at least one processor, perform at least the following:
  in response to detecting an object hovering over a touch display of a portable electronic device, temporarily disassociate the linking of orientation of content with respect to the orientation of the display of the portable electronic device to retain the orientation of the content with respect to the orientation of the display during a duration that the object hovers over the touch display, and to prevent rotation of the content during the duration of the object hovering over the touch display; and
  in response to detecting removal of the object hovering over the touch display of the portable electronic device, re-associate the linking of the orientation of content with respect to the orientation of the display of the portable electronic device such that the rotation is performed in response to a change in the orientation of the display.

* * * * *